United States Patent [19]

Evans et al.

[11] 4,339,786
[45] Jul. 13, 1982

[54] ANCHORING MEANS FOR AN ELECTRICAL DEVICE

[75] Inventors: William J. Evans, Indianapolis; Dennis R. Henderson, Greenwood, both of Ind.

[73] Assignee: Emhart Industries, Inc., Indianapolis, Ind.

[21] Appl. No.: 144,450

[22] Filed: Apr. 28, 1980

[51] Int. Cl.³ .............................................. H01G 9/06
[52] U.S. Cl. .................................. 361/433; 174/52 S; 361/272
[58] Field of Search ............. 361/433, 272; 174/52 S; 29/570

[56] References Cited

U.S. PATENT DOCUMENTS

| | | | |
|---|---|---|---|
| 2,758,258 | 8/1956 | Bliss et al. | 361/433 |
| 2,758,259 | 8/1956 | Peck | 361/433 |
| 2,856,570 | 10/1958 | Peck | 361/433 |
| 3,439,234 | 4/1969 | Braiman et al. | 361/433 |
| 3,463,969 | 8/1969 | Wershey | 361/433 |
| 3,697,824 | 10/1972 | Greskamp | 361/433 |

*Primary Examiner*—James W. Davie
*Attorney, Agent, or Firm*—Robert F. Meyer; David W. Gomes

[57] ABSTRACT

An electrical device includes a housing having an open end for receiving an electrical component, the housing including an inwardly extending flange located in proximity to the open end and the flange having surface area facing into the housing and away from the open end, anchoring structure adapted for positioning between the electrical component and the open end, the anchoring structure including a hub and at least two arms extending radially outwardly from the hub, the arms including radially extending ends having an effective distance therebetween which is larger than the size of the open end of the housing, and an abutment for abutting the hub against the electrical component, the arms being adapted for concave resilient deflection thereof into the housing for creating a biasing force against the electrical component and for reducing the effective distance between the radially extending ends for permitting installation of the anchoring structure into the open end and past the flange for engaging the radially extending ends against the surface area to maintain the deflection of the arms and thus the biasing force on the electrical component.

7 Claims, 3 Drawing Figures

ANCHORING MEANS FOR AN ELECTRICAL DEVICE

BACKGROUND OF THE INVENTION

1. Field of the Invention

The present invention generally relates to electrical devices of the type which include a housing containing an electrical component, and in particular, relates to anchoring means for securing the electrical component within the housing to prevent relative movement therebetween.

2. State of the Prior Art

Many electrical devices include an electrical component enclosed within a housing. In applications where such devices are exposed to mechanical shock or vibrations, it is often necessary to insure that the component does not move in relation to the housing to maintain the proper electrical functioning of the component. The capacitor is an example of such a component. One of the earliest ways of anchoring the capacitor or electrical component within the housing was to place tar or asphalt in the bottom of the housing around the electrical component. However, it was found that while the tar or asphalt is adequate to prevent movement of the electrical component in many applications, it does not prevent harmful movement in applications involving great amounts of mechanical vibration. Accordingly, many anchoring devices have been developed in an effort to secure the electrical component within the housing. Examples of these prior anchoring devices are described in U.S. Pat. Nos. 2,758,258; 2,758,259; 2,856,570; 3,439,234; 3,463,969; and 3,697,824. All but the last of these patents essentially describe anchoring devices which are positioned in the bottom of the housing. In contrast, U.S. Pat. No. 3,697,824 discloses an anchoring device which is positioned between the electrical component and a lid which is used for closing the housing to contain the component therein. The anchoring device includes a centrally located spike which is abutted on one end by the closing lid and on the other side by the electrical component. Support arms or lobes extend radially from the central spike to engage the side walls of the housing and the housing includes an annular rib past which the lobes of the anchoring device may be positioned. Unfortunately, the anchoring device of the '824 patent is still not completely successful in securing the electrical component from vibration. The anchoring device is still subject to fatigue which will degrade the force holding the electrical component, and the nature of the anchoring device occasionally causes damage to the electrical components, in particular, the delicate foil plates of the capacitor.

SUMMARY OF THE INVENTION

Accordingly, the present invention includes an anchoring arrangement for an electrical device including a housing having an open end for receiving an electrical component, wherein the improvement comprises the housing including an inwardly extending flange located in proximity to the open end and the flange having surface area facing into the housing and away from the open end, means adapted for positioning between the electrical component and the open end for anchoring the electrical component within the housing, the means for anchoring including a hub and at least two arms extending radially outward from the hub, the arms including radially extending ends having an effective distance therebetween which is larger than the size of the open end of the housing, and means for abutting the hub against the electrical component, the arms being adapted for concave resilient deflection thereof into the housing for creating a biasing force against the electrical component and for reducing the effective distance between the radially extending ends for permitting installation of the means for anchoring into the open end and past the flange for engaging the radially extended ends against the surface area thereof to maintain the deflection of the arms and thus the biasing force on the electrical component. The electrical device optionally includes a rigid member for sealing the open end thereof. The anchoring means optionally includes means for abutting the radially extending ends against the rigid member when the means for anchoring is installed between the electrical component and the rigid member for causing the concave deflection of the radially extending ends into the housing. This latter means for abutting includes spacer means located in proximity to the radially extending ends, the spacer means being adapted to clear the flange when the radially extending ends are engaged with the flange surface.

BRIEF DESCRIPTION OF THE DRAWINGS

The present invention is illustratively described in reference to the appended drawings in which.

DETAILED DESCRIPTION OF THE DRAWINGS

Figure 2:
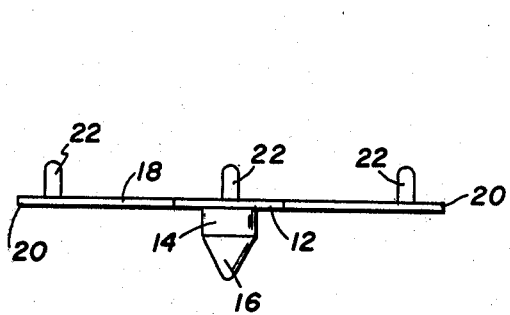
FIG. 2 is a side view of the anchoring means of FIG. 1.
Figure 1:
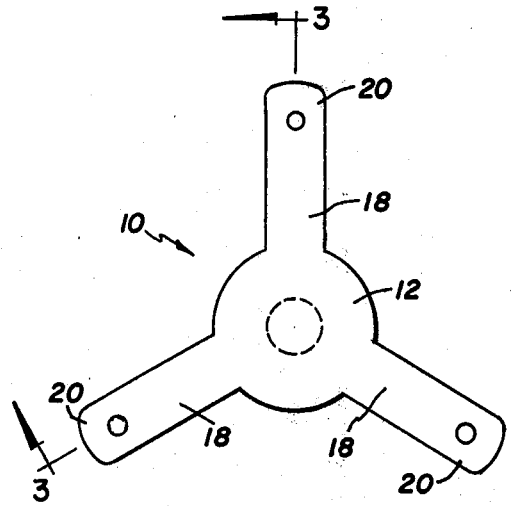
FIG. 1 is an end view of an anchoring means constructed according to one embodiment of the present invention.

In reference to FIGS. 1 and 2, an anchoring device 10 is shown which includes a central hub portion 12. The central hub portion 12 includes an axially extending spike 14 which is adapted for engaging an electrical component, in this case, the rolled foil plates of a capacitor. The spike 16 includes a conically shaped end portion which engages the central mandrel opening common to such capacitors. The anchoring means 10 also includes at least two, and in this case three, radially extending arms 18. The arms 18 terminate with radially extending ends 20. The ends 20 are rounded by an arc nominally having a radial center at the center of the anchoring means 10. Spacer means 22 are located in proximity to the radially extending ends 20. The spacer means 22 extend axially in the opposite direction from the spike 14. Arms 18 of the anchoring means 10 are resilient to adapt them for deflection to create a biasing force. Any suitable semi-rigid material may be used for fabricating the anchoring means 10. Examples of such materials are glass fiber reinforced nylon and polypropylene. The qualities which make these materials suitable are that they are chemically inert with respect to materials normally found in capacitors and that their performance will not deteriorate under elevated temperatures. Also, they are resilient enough to flex during installation, but rigid enough when in position to resist deformation during vibration. Nylon may be used at up to approximately 105° C. and polypropylene up to approximately 85° C.

Figure 3:
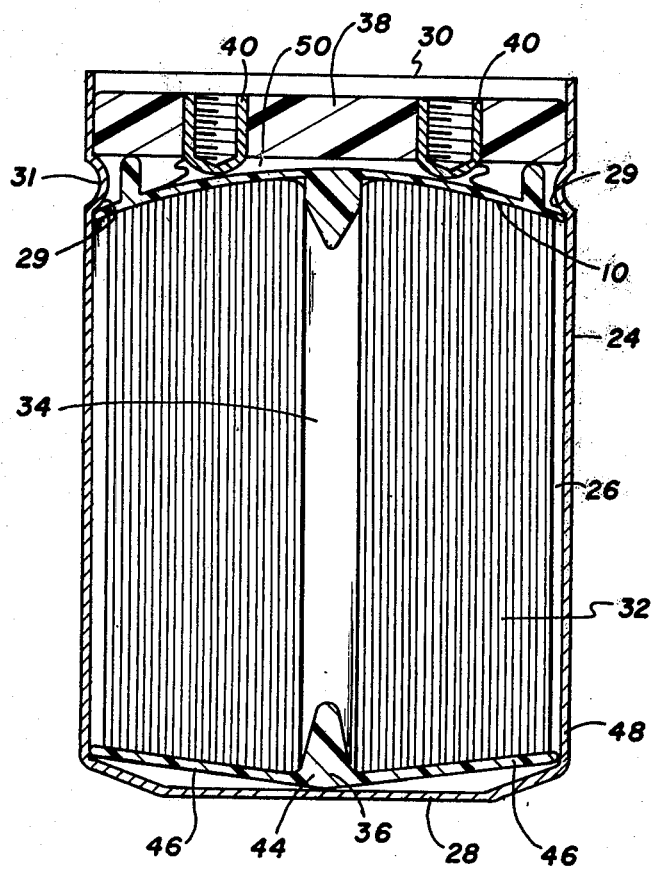
FIG. 3 is a sectional view of a capacitor including the achoring means of FIGS. 1 and 2, which anchoring means is oriented in FIG. 3 in accordance with the section line 3—3 of FIG. 1.

In reference to FIG. 3, the anchoring means 10 is shown in functional relationship with an electrical device 24. The electrical device 24 includes a housing 26 having a closed end 28 and an open end 30. The housing 26 is generally cylindrical in shape and may be fabricated from any suitable material such as a metal or metal alloy like aluminum or a thermoplastic material. Housing 26 includes an inwardly extending flange 31 located in proximity to the open end 30. The flange 31 has an inwardly facing surface area 29. The surface area 29 faces towards the closed end 28 and away from the open end 30. Housing 26 contains an electrical component 32, which in this case is a capacitor. The capacitor 32 is formed by a plurality of conductive and insulative sheets which are sandwiched together and typically wound around a mandrel (not shown). When the mandrel is removed, a hollow central core 34 typically remains. The capacitor 32 is held in position by a lower anchoring means 36 and the upper anchoring means 10 of the present invention. A rigid sealing member 38 closes the open end 30 of the housing 26. The rigid sealing member 38 is intended to abut the inwardly extending flange 31. The sealing member 38 may be fabricated from any suitable insulating material, and in one form phenolic resin is used. A pair of electrical connectors 40 are mounted in the sealing member 38. A pair of connecting wires or risers 42 are used to connect the electrical connectors 40 to conductive sheets in the capacitor body 32.

As mentioned, the lower end of the capacitor body 32 is engaged by a lower anchoring means. The lower anchoring means 36 generally includes a centrally extending spike 44 for engaging the central opening 34. Also included in the lower anchoring means 36 are at least two radially extending members 46 which abut the side 48 and closed end 28 of the housing 26 to maintain the spike 44 centrally located within the housing 26. Any suitable material may be used for fabricating the lower anchoring means 36, including glass fiber reinforced nylon and polypropylene.

As shown, the anchoring means 10 is located within the housing 26 between the component 32 and the rigid sealing member 38. A space 50 is left between the component 32 and the sealing member 38 for allowing resilient deflection of the anchoring means 10. As positioned, the central spike of the anchoring means 10 acts as a means for abutting the component 32 in the area of the central core 34. The sides of the spike 14 forceably engage the inside wall of the core 34. Also, as positioned, the axially extending spacer means 22 extend in the direction of the sealing member 38 and abut there against for applying biasing force to the anchoring means 10. Thusly, the central hub 12 and the spacer means 22 cause the radially extending arms 18 to concavely resiliently deflect into the housing 26 when the anchoring means 10 is installed between the capacitor 32 and the sealing member 38. Such deflection causes a biasing force to be set up between the capacitor 32 and the rigid member 38. Upon installation of the capacitor 32, anchoring means 10 and sealing member 38 into the housing 26, the flexibility of the anchoring means 10 allows the radially extending arms to concavely deflect to allow the radially extending ends 20 to be installed through the open end 30 and past the flange 31 to engage the flange surface 29, after such engagement is attained the radially extending arms 18 remain concavely deflected to produce the axial biasing force to hold the capacitor 32 against the lower anchoring means 36. The rounded shape of the ends 20 allow for easy installation past the flange 31. The shape also causes the ends 20 to approximately match the contour of the housing 26 to provide greater contact area therebetween.

In the manner described above, the anchoring means of the present invention attains a more secure relationship between the sealing member 38 and the capacitor 32 than did devices of the prior art. The reason for this is that the anchoring means 10 is flexible and can move with expansion and contraction of the electrical device under heating and cooling conditions. Previous anchoring means essentially relied upon abutment between the rigid member 38 and the capacitor 32. Unfortunately, the heating and cooling under which many capacitors are placed during electrical loading occasionally caused this abutment relationship to deteriorate allowing the capacitor 32 to become loose within the housing 26. The present invention maintains a biasing force with the resiliency of the anchoring means through relative management between the capacitor 32 and the rigid member 38. The deflection of the anchoring means 10 further acts to prevent the application of excessive force against the end of the capacitor 32 and thus prevents damage to the foil plates thereof. Should the forces of thermal expansion and contraction cause the capacitor 32 to move towards the rigid member 38, the anchoring means 10 merely deflects thus limiting the amount of force applied to the end of the capacitor 32. Further, upon installation of the capacitor 32, anchoring means 10 and rigid member 38 within the housing 26, the radially extending ends 20 of the anchoring means 10 locate past the flange 31 with a definitive click thus indicating to the assembler that the anchoring means is correctly in place. Thusly, the electrical device of the present invention may be assembled more reliably and with less possibility of damage to the electrical component contained therein.

It should be kept in mind that the embodiment of the present invention described above is intended to be taken in an illustrative and not a limiting sense, and that various modification and changes may be made to the present embodiment by persons skilled in the art without departing from the scope of the appended claims.

What is claimed is:

1. In an electrical device of the type including a housing having an open end for receiving an electrical component wherein the improvement comprises:

said housing including an inwardly extending flange located in proximity to said open end and said flange having surface area facing into said housing and away from said open end;

means positioned between said electrical component and said open end for anchoring said electrical component within said housing, said means for anchoring including a hub and at least two arms extending radially outward from said hub, said arms including radially extending arms having an effective distance therebetween which is larger than the size of said open end; and means for abutting said hub against said electrical component, said arms being made of semi-rigid resilient material and being concavely deflected into said housing, said arms engaging said surface area with said radially extending ends for creating a biasing force against said electrical component and away from said open end of said housing.

2. The electrical device of claim 1, further comprising a rigid member for sealing said open end to contain said electrical component within said housing.

3. The electrical device of claim 2, further comprising means for abutting said radially extending ends against said rigid member when said means for anchoring is installed between said electrical component and said rigid member for causing said concave deflection of said radially extending ends into said housing.

4. The electrical device of claim 3, wherein said means for abutting said radially extending ends includes spacer means located in proximity to said radially extending ends, said spacer means being located to clear said flange when said radially extending ends are engaged with said flange surface.

5. The electrical device of claim 1, wherein said electrical component includes a centrally located opening facing in the direction of said open end and further wherein first said means for abutting includes an axially extending spike for engagement with said centrally located opening.

6. The device of claim 1, wherein said electrical component is a capacitor.

7. The device of claim 1, wherein said housing is cylindrical and said radially extending ends of said arms are rounded to approximately match the contour of said housing.

* * * * *